United States Patent [19]

Chi

[11] Patent Number: 5,572,909
[45] Date of Patent: Nov. 12, 1996

[54] COUPLING MEANS FOR ENGAGEMENT BETWEEN A HOUSING AND A TUBE IN A BOTTOM BRACKET

[76] Inventor: Yi C. Chi, No. 139-5, An Mei Rd., Mei Shan Village, Hou Li Hsiang, Taichung Hsien, Taiwan

[21] Appl. No.: 188,058

[22] Filed: Jan. 26, 1994

[51] Int. Cl.⁶ .................................................. F16C 19/08
[52] U.S. Cl. ........................................ 74/594.1; 384/458
[58] Field of Search ............................... 74/594.1, 594.2, 74/594.3; 384/458, 538, 540

[56] References Cited

U.S. PATENT DOCUMENTS

| | | | |
|---|---|---|---|
| 5,118,205 | 6/1992 | Hoffmann | 384/458 |
| 5,181,437 | 1/1993 | Chi | 74/594.1 |

FOREIGN PATENT DOCUMENTS

| | | | |
|---|---|---|---|
| 2135399 | 9/1984 | United Kingdom | 384/458 |

Primary Examiner—Charles A. Marmor
Assistant Examiner—Mary Ann Battista
Attorney, Agent, or Firm—Abelman, Frayne & Schwab

[57] ABSTRACT

A structure of a bottom bracket includes a housing having first and second ends, each having a thread portion formed in an inner peripheral surface thereof, a tube having first and second ends, the first end thereof having a thread portion formed in an outer peripheral surface thereof for engagement to the thread portion of the first end of the housing, a tapered outer peripheral surface being formed on an outer peripheral surface of the second end of the tube, an axle rotatably extending through the tube with bearings being disposed therebetween and a cap having first and second ends, a thread portion being formed in an outer peripheral surface of the first end thereof for engagement to the second end of the housing, a tapered inner peripheral surface being formed on an inner peripheral surface of the first end of the cap for engagement to the tapered outer peripheral surface of the tube.

1 Claim, 3 Drawing Sheets

COUPLING MEANS FOR ENGAGEMENT BETWEEN A HOUSING AND A TUBE IN A BOTTOM BRACKET

BACKGROUND OF THE INVENTION

The present invention relates to a structure of a bottom bracket and more particularly to an improved structure of a bottom bracket having tapered engaging peripheral surfaces formed between a cap and a tube thereof.

A conventional bottom bracket includes a housing, a tube disposed in the housing, an axle rotatably engaged in the tube with bearings disposed therebetween and a cap threadedly engaged to an end of the housing. The engagement between the cap and the axle will loosen due to the vibration when riding on a rugged road.

The most relevant art of which applicant is aware is his prior U.S. Pat. No. 5,181,437 to Chi, entitled "HUB OF A BICYCLE", filed Jul. 13, 1992. Generally, the tube 30 is rotatably engaged to the shell 20, and has a cone 31 formed integrally on the outer peripheral portion of one end, the cone 31 including a tapered surface 32 formed in the outer peripheral portion thereof for engagement with the tapered surface 22 of the hub shell 20. The Cap 35 includes an inner thread 36 formed therein for threaded engagement with the outer thread 33 of the tube 30 and includes a tapered surface 37 formed in the outer peripheral portion thereof for engagement with the tapered surface 21 of the hub shell 20. There could be some gap existing between the tapered surfaces 32, 22 if some manufacturing errors have occurred in manufacturing the thread portions 33, 36, or if the assembling operation between the cap and the tube is not precise enough. Moreover, the arrangement having no cap disposed in the end opposite to cap 35 will lead to serious damage of the bearings received in the tube by entry of grit, dust, water etc.

The present invention intends to provide an improved structure of a bottom bracket to mitigate and/or obviate the above mentioned problems.

SUMMARY OF THE INVENTION

The present invention provides a structure of a bottom bracket which includes an axle rotatably extending through a tube and the tube being threadedly engaged to a housing. A tapered outer peripheral surface is formed in an end of the tube and a cap is threadedly engaged to the other end of the housing opposite to the end of which the tube threadedly engaged. The cap has a tapered inner peripheral surface for engagement to the tapered outer peripheral surface of the tube.

It is an object of the present invention to provide a structure of a bottom bracket having a cap with tapered inner peripheral surface and a tube having a tapered outer peripheral surface, which achieves an anti-loosening effect by engaging the tapered outer and inner surfaces of the tube and the cap.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
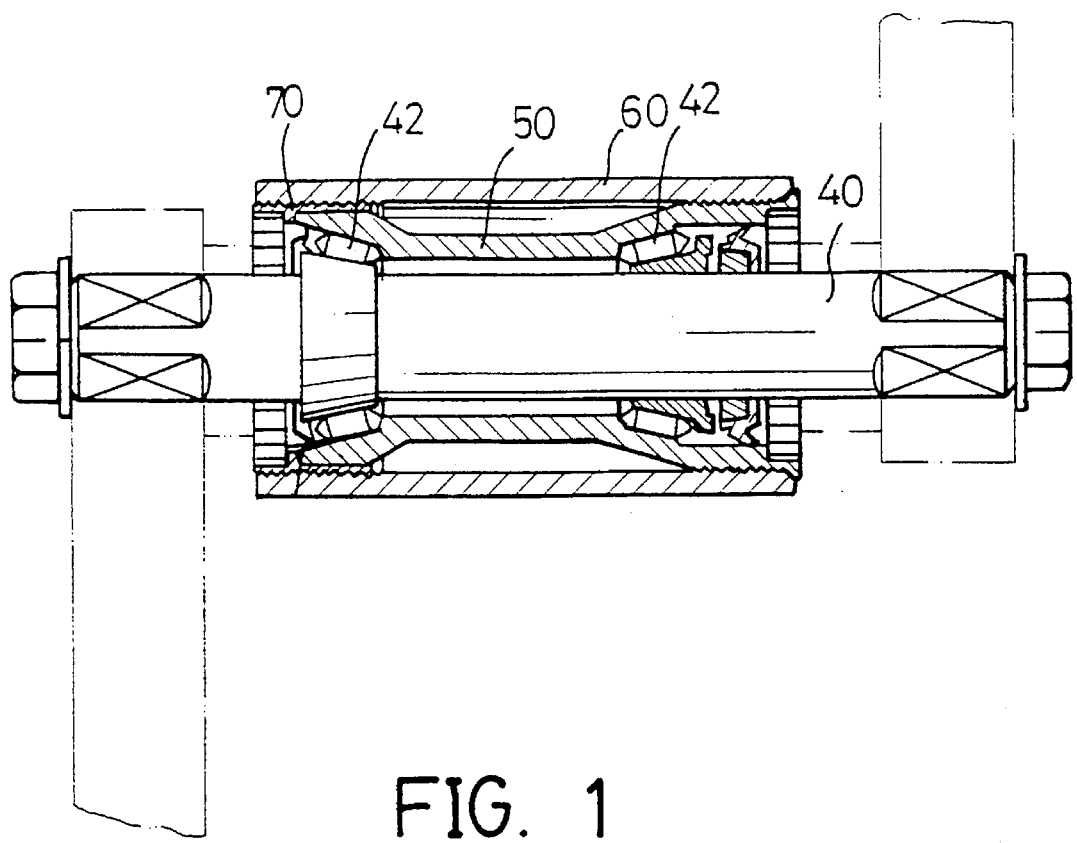
FIG. 1 is a side elevational view, partly in section, of a structure of a conventional bottom bracket.

Referring to FIG. 1, a conventional structure of a bottom bracket comprises a housing 60 having first and second ends each of which having a thread portion formed therein, an axle 40 extending through a tube 50 in a manner of disposing two bearings 42 therebetween, the tube 50 having a thread portion formed in an end thereof for engagement with the first end of the housing 60, the other end of the tube 50 being fitted in a sleeve 70 having a thread portion formed in an outer peripheral surface thereof for engagement with the second end of the housing 60 and a cap being fitted in the sleeve 70 to cover the second end of the housing 60. The fitting of the tube 50 and the sleeve 70 is poor if the thread portion of the sleeve 50 has a slight manufacturing error, or if the clearance between the sleeve 70 and the tube 50 is large, which may cause dangerous results when riding on a rugged road or riding in mountainous terrain.

Figure 2:
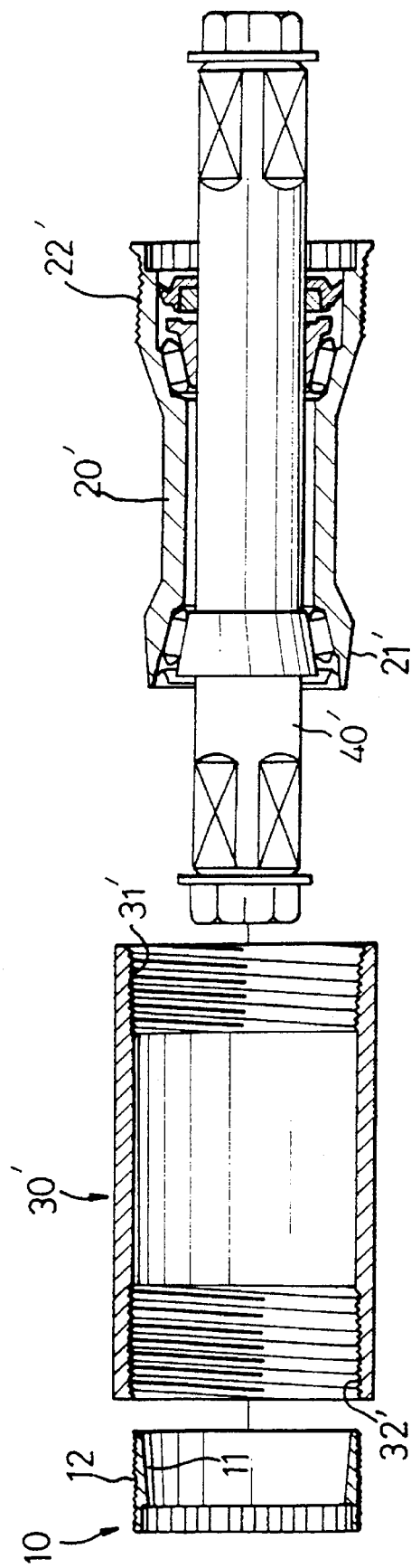
FIG. 2 is a partly exploded view of a structure of a bottom bracket in accordance with the present invention.
Figure 3:
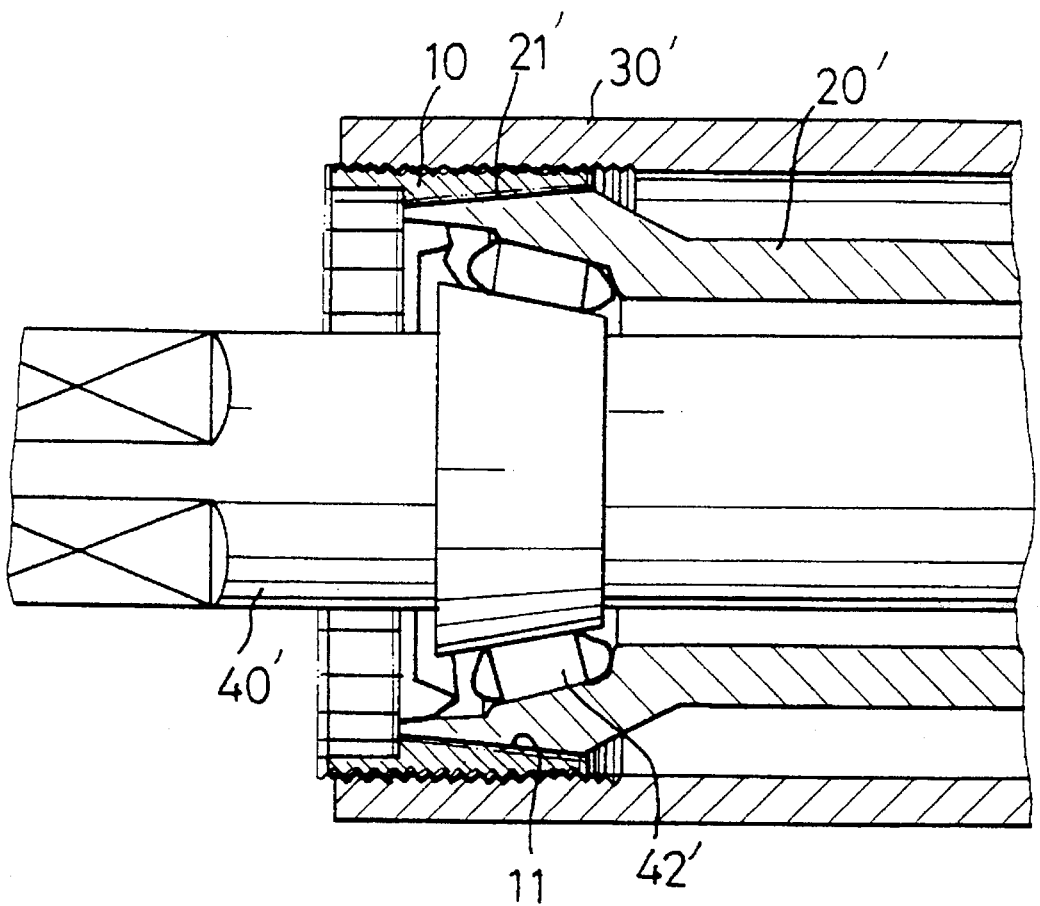
FIG. 3 is a side elevational view, partly in section, of part of the structure of a bottom bracket in accordance with the present invention.

Referring to FIGS. 2 and 3, a structure of a bottom bracket in accordance with the present invention generally includes a housing 30' having first and second ends, each having a thread portion 31', 32' formed in an inner peripheral surface thereof, a tube 20' having first and second ends, the first end thereof having a thread portion 22' formed in an outer peripheral surface thereof for engagement to the thread portion 31' of the first end of the housing 30', a tapered outer peripheral surface 21' being formed on an outer peripheral surface of the second end of the tube 20', an axle 40' rotatably extending through the tube 20' by disposing bearings 42' therebetween and a cap 10 having first and second 9 ends, a thread portion 12 being formed in an outer peripheral surface of the first end thereof for engagement to the thread portion 32' of the second end of the housing 30', a tapered inner peripheral surface 11 being formed on an inner peripheral surface of the first end of the cap 10 for engagement to the tapered outer peripheral surface 21' of the tube 20'.

The tube 20' in which the axle 40 extends therethrough is threadedly engaged in the first end of the housing 30' first when assembling the bottom bracket, then the cap 10 is screwed into the second end of the housing 30' and the tapered outer peripheral surface 21' of the second end of the tube 20' can be fitted tightly in the tapered inner peripheral surface 11 of the cap 10, such an arrangement has a centering adjustment effect to compensate for any possible lack of precision during manufacturing process and to reduce the clearance when assembling.

Although the invention has been explained in relation to its preferred embodiment, it is to be understood that many other possible modifications and variations can be made without departing from the spirit and scope of the invention as hereinafter claimed.

I claim:

1. A structure of a bottom bracket comprising:

a housing having first and second ends, each of said ends having a thread portion formed in an inner peripheral surface thereof;

a tube having first and second ends, said first end of said tube having a thread portion formed in an outer peripheral surface thereof for engagement with said thread portion of said first end of said housing;

an axle rotatably extending through said tube with bearings being disposed therebetween, the improvement comprising:

a tapered outer peripheral surface being formed on an outer peripheral surface of said second end of said tube and a cap having a first end and a second end, a thread portion being formed in an outer peripheral surface of said first end of said cap for engagement with said second end of said housing, a tapered inner peripheral surface being formed on an inner peripheral surface of said first end of said cap for engagement with said outer peripheral surface of said tube.

* * * * *